Jan. 30, 1934.   H. D. BLACK   1,945,214
AIR BRAKE FOR AIRCRAFT
Filed Oct. 16, 1931   4 Sheets-Sheet 1
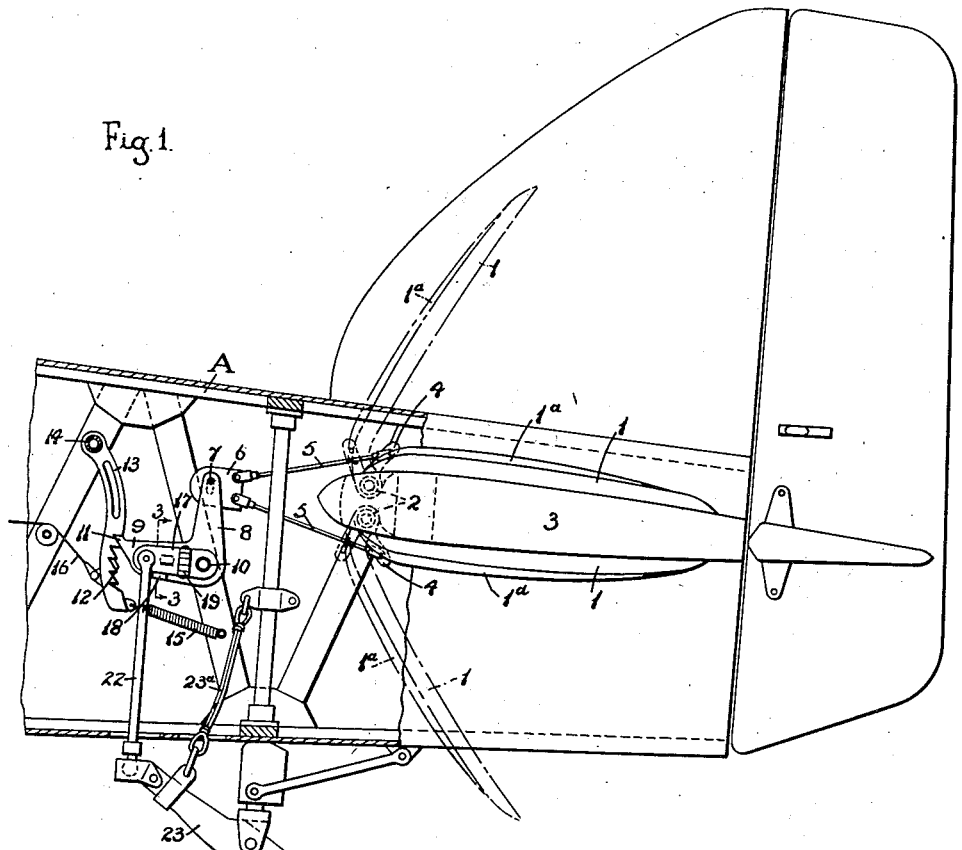
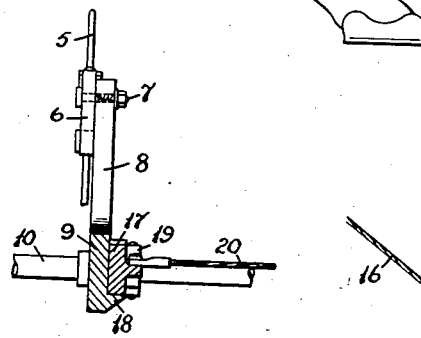
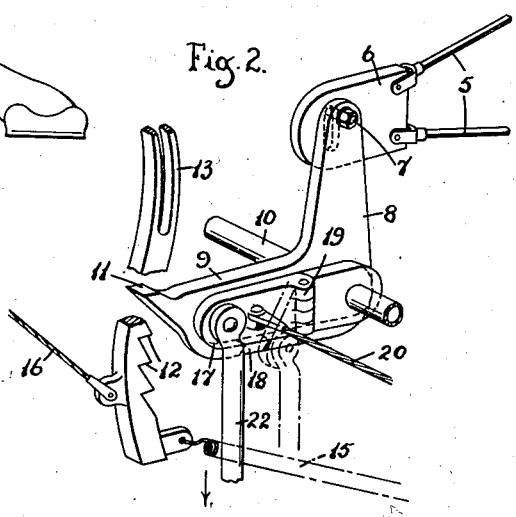

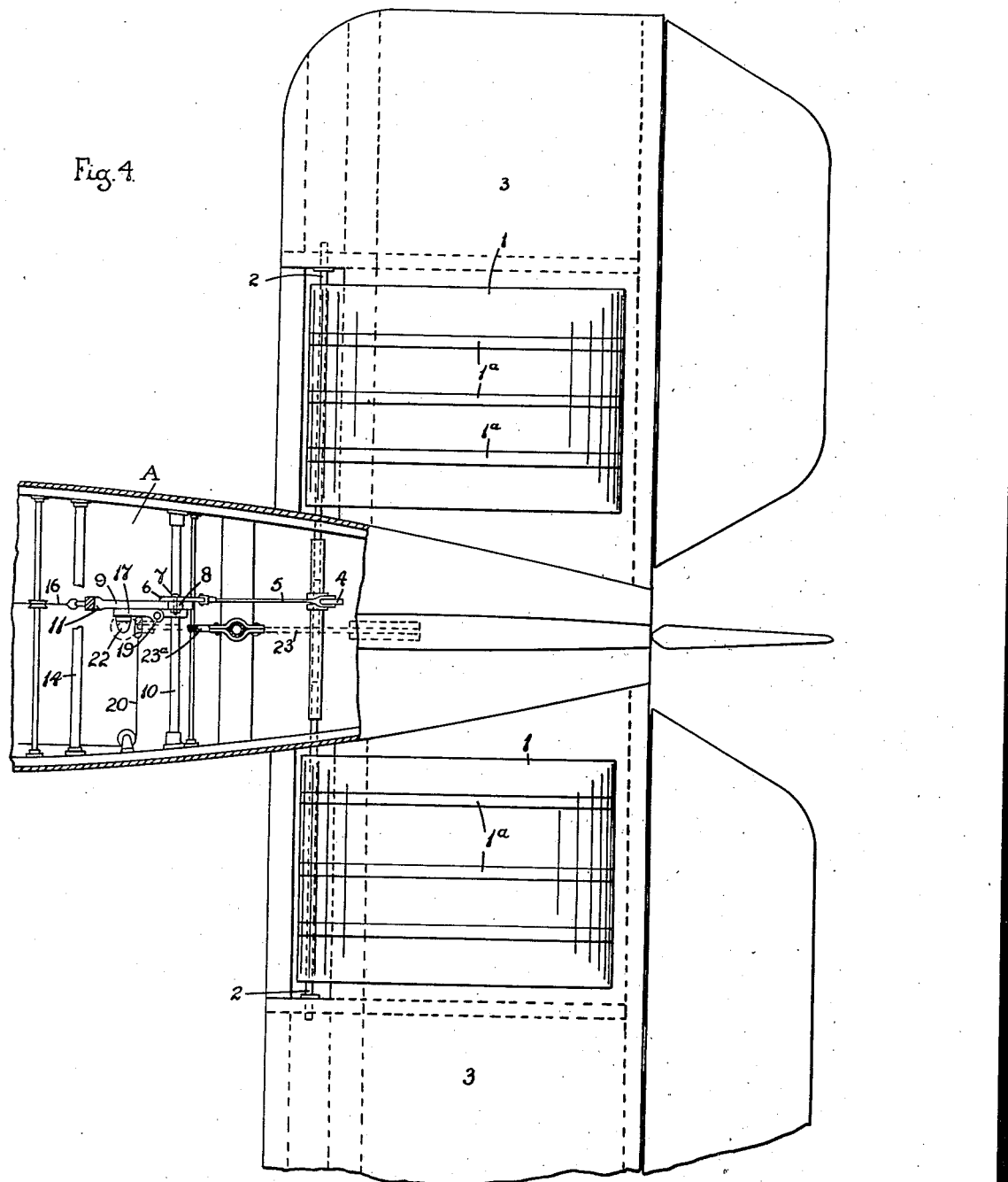

Jan. 30, 1934.  H. D. BLACK  1,945,214
AIR BRAKE FOR AIRCRAFT
Filed Oct. 16, 1931  4 Sheets-Sheet 3

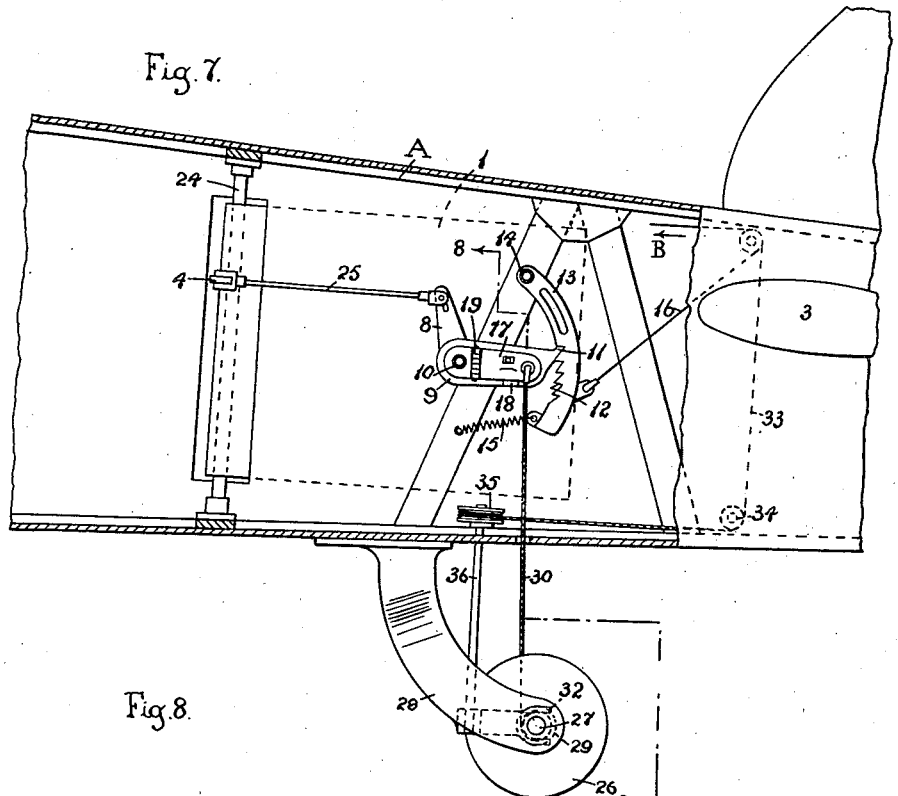
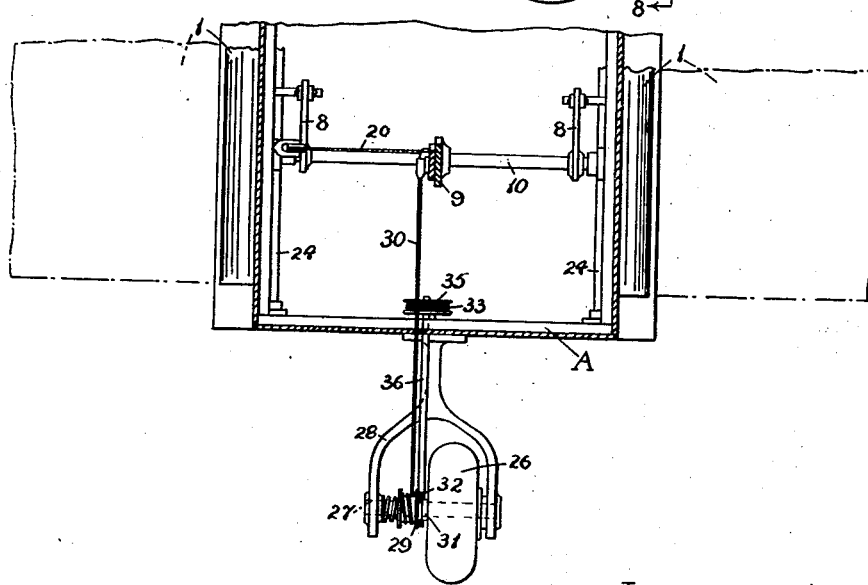

Patented Jan. 30, 1934

1,945,214

UNITED STATES PATENT OFFICE 1,945,214

AIR BRAKE FOR AIRCRAFT

Horace Drummond Black, Uxbridge, England

Application October 16, 1931, Serial No. 569,340, and in Great Britain October 16, 1930

6 Claims. (Cl. 244—29)

This invention relates to improvements in air brakes for aircraft and has for one object to provide an improved form of air brake which may be brought into operation when the tail of an aircraft contacts with the ground on landing.

According to the invention there is provided an air brake for aircraft which comprises means (for example, a pair of vanes pivotally supported upon the tail structure) operatively connected to the tail (for example, to the skid) thereof, in such a manner that when the tail contacts with the ground, the said means are automatically moved from a normally inoperative position to a position substantially transverse to the line of flight, so as to create a resistance with the air which impedes the travel of the aircraft.

In order that the invention may be fully understood, reference is directed to the accompanying drawings, in which:—

Figure 1 illustrates in sectional side elevation the tail of an aeroplane provided with air brake mechanism constructed in accordance with this invention.

Figure 2 illustrates a detail perspective view of a portion of the mechanism illustrated in Figure 1 drawn to a larger scale than the latter figure and hereinafter described.

Figure 3 is a section to a larger scale on the line 3—3 of Figure 1.

Figure 4 is a sectional plan of Figure 1.

Figure 7 is a view similar to Figure 5 illustrating a modified form of the invention, and Figure 8 is a section on the line 8—8 of Figure 7.

Figure 6:
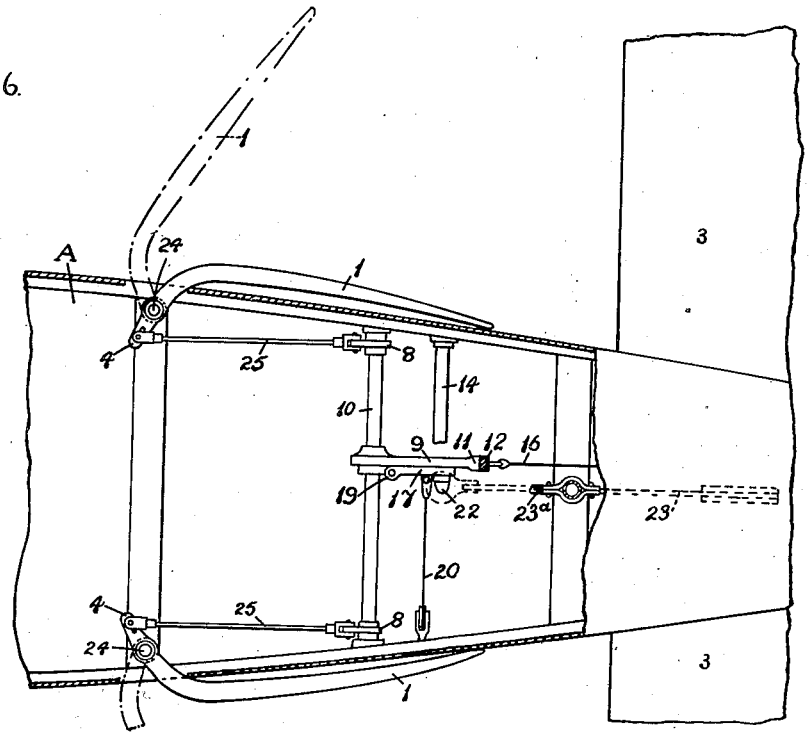
Figure 6 is a sectional plan of Figure 5.

Referring to Figures 1 to 4, an air brake mechanism for an aircraft is illustrated which comprises two pairs of vanes 1 located upon either side of the fuselage A of an aeroplane, one vane of each pair being located above the tail plane 3 and the other vane of each pair below the said tail plane. The vanes 1 located above the tail plane and the vanes 1 located below the said plane are mounted at their forward edges upon corresponding spindles 2 pivotally mounted in bearings provided in the forward portion of the tail plane 3. The spindles 2 of the upper vanes and the spindles 2 of the lower vanes are rigidly connected respectively to one of a pair of arms 4, the free ends of which are connected by rods 5 to a plate 6. The plate 6 is coupled by a pin and slot connection 7 to one arm 8 of a bell crank lever 8, 9 which is pivotally mounted at 10 to the frame members of the fuselage. The arm 9 of the bell crank lever is provided with a pawl extension 11 arranged to co-act with detent teeth 12 formed upon a sector arm 13 pivotally mounted at its upper end 14 to the frame of the fuselage. The teeth 12 are normally maintained in engagement with the pawl 11 by a spring 15 and a cable 16 is connected at one end to the arm 13 and at the other end (not shown) to a control operable to move the sector arm 13 out of contact with the pawl 12 against the influence of the spring 15. An arm 17 is pivotally mounted at 10 co-axially with the bell crank 8, 9, but so as to be capable of pivotal movement independently of the bell crank and is normally arranged to abut at its lower edge against a projection 18 provided upon the lower edge of the arm 9 of the bell crank, and is chamfered upon its underside for a purpose hereinafter described. The arm 17 is formed in two parts connected together by a vertical hinge 19 and one end of a cable 20 is connected to the free end of the said arm whilst the other end of the cable is connected to a control which is operable to swing the free end of the arm 17 clear of the projection 18, as indicated in dot and dash lines in Figure 2, for a purpose hereinafter described. A spring (not shown) which may be incorporated in the hinge 19 is arranged to maintain the free end of the arm 17 in the position in which it extends over the projection 18. A link 22 is arranged to connect the free end of the arm 17 to an extension of the tail skid 23 of the aeroplane.

The brake mechanism operates as follows:—

Upon the tail skid 23 contacting with the ground the weight of the tail causes the skid to be rocked about its pivot and the link 22 moves the arm 17 downwardly so that it contacts with the projection 18 and moves the bell crank lever in an anti-clockwise direction (Figure 1). This movement of the bell crank causes the vanes 1 to be moved about their pivots into the positions indicated in dot and dash lines in Figure 1, in which position they are maintained by the teeth 12 of the sector arm 13. The vanes thus extend transversely across the line of flight of the aeroplane and act as an air brake to assist in bringing the aeroplane to a standstill.

The vanes 1 may be released by disengaging the teeth 12 from the pawl 11 through the medium of the control and cable 16 and the mechanism may be rendered inoperative, such, for example, as when the aeroplane is taking off, by swinging the free end of the arm 17 clear of the projection 18 as above described.

The chamfering of the underside of the projection 18 ensures that the arm 17 will be deflected thereby if at any time the said arm moves from a position below the arm 9 of the bell crank lever to a position in which it is free to move over the said projection.

Arrangements could obviously be made whereby the braking vanes on the upper side of the tail plane were designed to extend more into a position transverse to the line of flight than the under braking planes, in order to maintain that desirable downward pressure upon the tail of a plane when in the process of landing.

Figure 5:
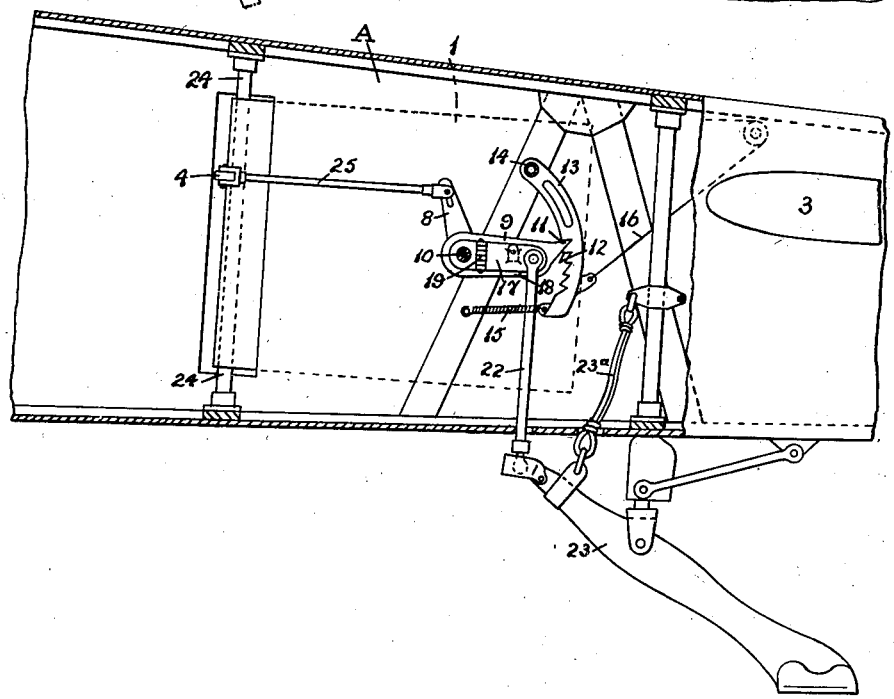
Figure 5 is a view similar to Figure 1 but illustrating a modified form of the invention.

Referring to Figures 5 and 6, a modified brake mechanism is illustrated in which a pair of air brake vanes 1 are mounted upon vertical pivots 24 and are normally arranged to lie against the sides of the fuselage of the aeroplane. Arms 4 provided upon the vanes 1 are connected by rods 25 to arms 8 carried by a cross bar 10 rigidly connected to an arm 9 so as to constitute a bell crank lever similar to that described with reference to Figures 1 to 4. The remaining parts of the mechanism are substantially similar to the parts of the mechanism hereinbefore described and the operation thereof is the same.

The vanes 1 may be strengthened, if necessary, by means of metal ribs, such as are indicated at 1a, Figures 1 and 4.

In a modification of the invention, the vanes may be pivoted one on either side of the leading edge of the fin of the aircraft, so as normally to be maintained folded against the fin by air pressure during flight. The vanes are connected by lever mechanism as hereinbefore described to the tail skid in such a manner that the said vanes may be moved to a position substantially transverse to the line of flight to produce a braking effect on the aircraft.

The tail skid is preferably provided with shock absorbing means 23a, which are associated with the skid in such a manner that a predetermined amount of lost motion is permitted before the shock-absorbing mechanism is brought into action. Preferably, the arrangement is such that the lost motion between the tail skid and the shock-absorbing mechanism is employed to effect the actuation or a partial actuation of the braking vanes.

In a still further modification, the braking vanes may be disposed on horizontal pivots arranged above and below the fuselage, or again on horizontal pivots disposed between the upper and lower planes of bi-planes, the vanes being controlled as hereinbefore described.

Referring now to Figures 7 and 8, there is illustrated a further modification in which a tail-wheel 26 is provided in lieu of the tail skid hereinbefore referred to. The said tail-wheel 26 is mounted upon an axle 27 arranged in bearings in a fork member 28, and the said fork member is secured to the fuselage A. Mounted upon the axle 27 of the tail-wheel 26 is a drum 29 to which is secured one end of a cable 30, which takes the place of the link 22 illustrated in Figure 5. The drum 29 is arranged to be driven by the hub of the tail-wheel 26 through the medium of a frictional clutch mechanism 31, so that as the wheel rotates the cable 30 is normally wound upon the drum 29. The drum 29 is arranged to be moved out of engagement with the wheel 26 by means of a fork member 32 which is operatively connected to the cable 16 by a cable 33 which is arranged to extend around a pulley 34 and thereafter to a pulley 35 secured to a shaft 36 rigidly connected to the fork member 32.

The brake mechanism is arranged to operate as follows:—

Upon the tail-wheel 26 contacting with the ground the wheel rotates the drum 29 and winds the cable 30 upon the drum 29 so that the bell crank lever constituted by the arms 8 and 9 is moved in a clockwise direction and the air-brake vanes are moved so as to extend transversely across the line of flight of the aeroplane.

Further rotation of the tail-wheel causes the frictional clutch members to permit the hub of the wheel 26 to slip relatively to the drum 29.

When it is necessary to collapse the vanes upon the fuselage, the cable 16 is moved in the direction of the arrow B, Figure 7, so as to release the sector arm 13 from engagement with the arms 8 and 9, and permit the same to move in an anti-clockwise direction whilst at the same time the drum 29 is moved by the fork member 32 out of engagement with the wheel 26 so as to permit the cable 30 to be unwound from the drum 29.

It will be appreciated that an air brake constructed according to the invention may be brought into action immediately the tail skid of an aircraft contacts with the ground on landing, the braking vanes opening out automatically and producing a retardation effect on the forward motion of the aeroplane, the moment the tail skid contacts with the ground.

What I claim is:—

1. An air brake for aircraft which comprises in combination at least one braking surface movably mounted upon the aircraft and normally disposed in an inoperative position at the rear of the aircraft, an operative connection between the said surface and a tail skid carried by the aircraft including a lost motion device, whereby when the tail skid contacts with the ground as the aircraft alights, the said braking surface is moved automatically to a position substantially transverse to the line of flight of the aircraft, mechanism for locking the braking surface in the said braking position and means for releasing said locking mechanism, for the purpose specified.

2. An air brake for aircraft which comprises in combination at least one braking surface movably mounted upon the rear of the aircraft and normally disposed in an inoperative position and an operative connection including a slipping clutch between the said surface and a landing wheel carried by the tail of the aircraft, whereby when the said wheel contacts with the ground and is rotated as the aircraft alights, the said braking surface is moved automatically to a position substantially transverse to the line of flight of the aircraft.

3. An air brake for aircraft which comprises in combination at least one braking surface movably mounted upon the rear of the aircraft and normally disposed in an inoperative position, an operative connection including a slipping clutch between the said surface and a landing wheel carried by the tail of the aircraft, whereby when the said wheel contacts with the ground and is rotated as the aircraft alights, the said braking surface is moved automatically to a position substantially transverse to the line of flight of the aircraft, mechanism for locking said braking surface in the said braking position thereof and means for releasing said locking mechanism, for the purpose specified.

4. An air brake for aircraft which comprises in combination at least one braking surface movably mounted upon the rear of the aircraft and normally disposed in a position which is ineffective to vary the normal flight of the aircraft, a movable member mounted on the tail of the aircraft and normally extending below the same and an operative connection between said member and the braking surface whereby when the said member contacts with the ground as the aircraft alights, said braking surface is moved automatically to a position substantially transverse to the line of flight of the aircraft, and means operable by an operator to disconnect the said member from the said braking surface, for the purpose specified.

5. In an air brake for aircraft the combination of at least one braking surface movably mounted upon the rear of the aircraft normally disposed in an inoperative position and ineffective to vary the normal flight of the aircraft, an operative connection between the said surface and a tail skid carried by the aircraft whereby when the tail skid contacts with the ground as the aircraft alights, the said braking surface is moved automatically into a rigid position substantially transverse to the line of flight of the aircraft and means operable by an operator to disconnect the said braking surface from the tail skid, for the purpose specified.

6. An air brake for aircraft which comprises in combination at least one braking surface movably mounted upon the rear of the aircraft and normally disposed in an inoperative position, an operative connection between said surface and a landing wheel carried by the aircraft whereby when the said wheel contacts with the ground and is rotated as the aircraft alights, the said braking surface is moved automatically to a position substantially transverse to the line of flight of the aircraft, and means operable by an operator to disconnect the said wheel from the braking surface.

HORACE DRUMMOND BLACK.